March 21, 1961 E. HIATT, SR 2,976,034
CHUCK FOR GLASS BLOCK MACHINE
Filed Jan. 27, 1956 2 Sheets-Sheet 1
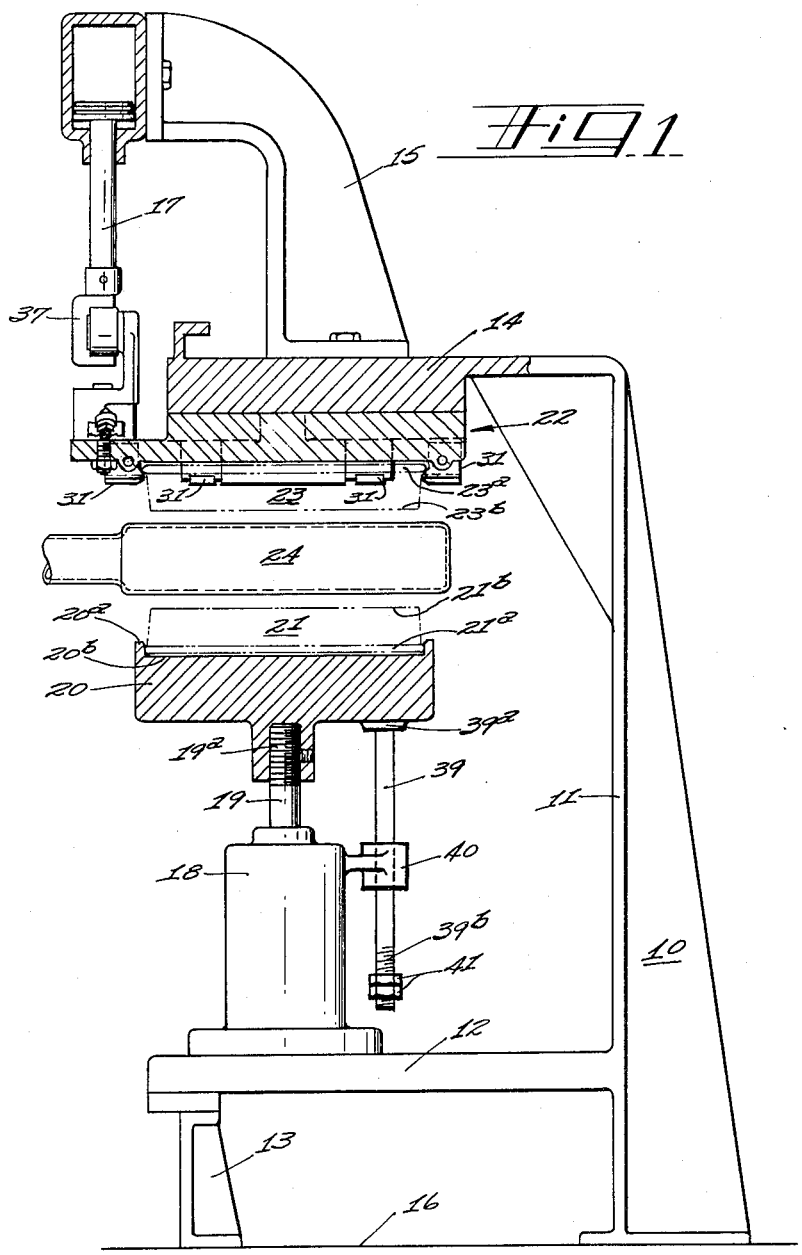
INVENTOR.
EARL HIATT, SR.
BY
W.A. Schaich &
Leonard R. Soubier
ATTORNEYS

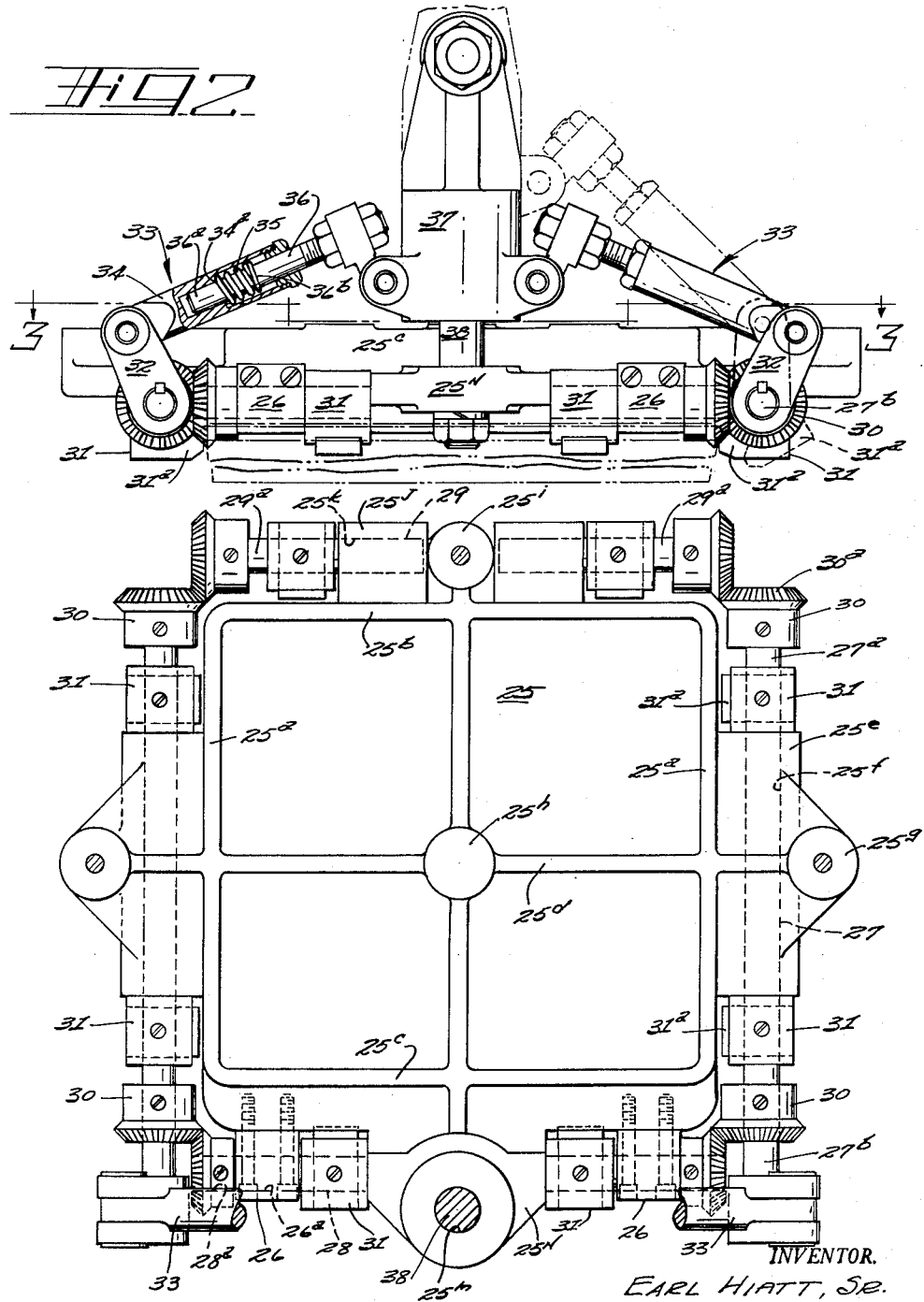

United States Patent Office 2,976,034
Patented Mar. 21, 1961

2,976,034

CHUCK FOR GLASS BLOCK MACHINE

Earl Hiatt, Sr., R.R. 5, Muncie, Ind.

Filed Jan. 27, 1956, Ser. No. 561,810

4 Claims. (Cl. 269—189)

The present invention relates to an improvement in apparatus for fabricating building blocks from preformed block sections, and more particularly to an improvement in apparatus for supporting a glass block section in registered alignment with another complemental glass building block section prior to hermetically sealing the sections into a unified hollow glass building block.

In present-day commercial methods for fabricating glass building blocks it has been found to be particularly desirable to produce a hermetically sealed glass block having a partial vacuum therein to increase the thermal insulating properties of the block. The partial vacuum is generally attained by heating gases, or air, entrapped within the block while the block sections are being sealed together, which gases, or air, upon subsequent cooling develop a partial vacuum within the sealed block. This vacuum may cause a failure in the seal if there is a misfit or thin seal between the sealed sections.

Two of the more prominent causes of misfit are; an initial misalignment of the complemental sections, and a sagging of the sections resulting from a softening of the glass during the preheating of the block sections prior to the sealing operation.

Therefore, it is an object of this invention to provide an apparatus which will substantially eliminate initial misalignment of the complemental glass block sections prior to and during the sealing operation.

Another object of this invention is to provide an improved apparatus which will substantially prevent sagging of heat-softened glass block sections during the preheating and sealing operation.

A still further object of this invention is to provide an improved apparatus for supporting a glass block section characterized by resilient grasping means which will maintain a glass block section in substantially registered alignment while accommodating for considerable configurational and dimensional variance between successive glass block sections.

A still further object of this invention is to provide an improved apparatus accomplishing the aforementioned objects which is easily adaptable to many present-day commercial glass block sealing machines without reducing the productivity of those machines.

The specific nature of this invention, as well as other objects and advantages thereof, will become apparent to those skilled in the art from the following detailed description, taken in conjunction with the annexed sheets of drawings on which, by way of preferred example only, are illustrated the preferred embodiments of this invention.

Fig. 1 is a sectional side elevational view substantially through the center of a glass block sealing machine embodying this invention.

Fig. 2 is a front elevational view of a supporting chuck for a glass block section illustrating a preferred embodiment of this invention.

Fig. 3 is a sectional plan view of the supporting chuck taken along the line 3—3 on Fig. 2.

With reference to Fig. 1, there is illustrated a glass block sealing machine in which the present invention is embodied. The component parts of this sealing machine are generally mounted upon a rigid upright supporting stand 10 comprising an upright body member 11 which is suitably mounted upon a rotatable table 16, and a horizontally disposed lower platform 12 laterally supported by the upright body member 11 and a leg 13. Also comprising the supporting stand 10 is a rigidly reinforced upper platform 14 laterally supported by the upright body member 11 in substantially parallel overlying relationship to the lower platform 12.

A curved suspension beam 15 projects upwardly from the upper platform 14 and supports a cam operated driving arm 17 which in turn is connected to a reciprocatory actuator 37.

The lower platform 12 supports a vertically positioned cylinder 18 and cooperating piston 19. The piston 19 imparts substantially vertical reciprocatory movement to a lower glass block section supporting chuck 20 securely mounted on the upper end 19a of the piston 19. A guide rod 39, journalled slidably through a journal block 40 integrally formed on the side of the piston cylinder 18, has an upper end portion 39a secured to the underside of the lower supporting chuck 20 to prevent rotary movement of the piston 19 and attached supporting chuck 20. Additionally, the lower end portion 39b of the guide rod 39 has adjustment nuts 41 threaded thereon to adjust the extent of the upward travel of the piston 19 and attached supporting chuck 20. The lower supporting chuck 20 has a marginal rim 20a defining a recessed upper face 20b which snugly engages the integrally formed peripheral rim 21a of a lower glass block section 21.

Rigidly suspended from the upper platform 14 is an upper glass block section supporting chuck 22 positioned in vertically spaced registered alignment with the lower supporting chuck 20. The upper supporting chuck 22 supports an upper glass block section 23 by engaging a peripheral rim 23a integrally formed on the glass block section 23.

Intermediate the upper supporting chuck 22 and the lower supporting chuck 20 is a heating unit 24 for preheating the oppositely disposed sealing edges 21b and 23b of the glass block sections 21 and 23, respectively, prior to the sealing operation.

As illustrated in Fig. 3, the upper supporting chuck 22 has a substantially rectangular body member 25 comprising; a pair of transverse sides 25a, a rearward side 25b, and a forward side 25c, which are reinforced by ribs 25d interconnecting each of said sides 25a, 25b, and 25c with a central boss 25h.

Each of the transverse sides 25a of the body member 25, defines an integral centrally positioned, outwardly protruding guide block 25e. Each guide block 25e defines a longitudinal bore 25f, therethrough, which is in substantially axial parallel relationship to its respective side. Also, an integrally formed boss 25g protrudes upwardly from each guide block 25e and defines internal threads for securement of the body member 25 to the upper platform 14.

The rearward side 25b, of the body member 25, also defines an integral central boss 25i. The boss 25i likewise is internally threaded for securement to the upper platform 14. Additionally, a pair of rear guide blocks 25j are integrally formed on the rearward side 25b of the body member 25 and straddle the boss 25i. Each of the rear guide blocks 25j defines a longitudinal central bore 25k which is in substantially axial parallel relationship with the rearward side 25b, of the body member 25. The axes of the bores 25k are further so positioned to proximately intersect the axes of the bores 25f, defined by the side guide blocks 25e, in substantially perpendicular relationship.

The forward side 25c, of the body member 25, has a forwardly protruding centrally positioned ledge 25n which defines a transverse opening 25m therethrough. A pair of front guide blocks 26 are bolted to the forward side 25c, of the body member 25, in oppositely spaced relationship relative to the ledge 25n. Each of the front guide blocks 26, likewise, defines a longitudinal central bore 26a in substantially axial parallel relationship with the forward side 25c, of the body member 25, and is positioned to proximately intersect the axis of the bore 25f defined by a side guide block 25e.

Journalled within each bore 25f defined in the side guide block 25e is a side shaft 27. Each side shaft 27, or otherwise described, a main shaft extends axially beyond both ends of its respective side guide block 25e to form a rear end portion 27a adjacent to the rearward side 25b, of the body member 25, and a front end portion 27b terminating forwardly of the forward side 25c, of the body member 25. Journalled within each front guide block 26 is a front shaft 28 having an outer end portion 28a terminating adjacent to a side shaft 27. Likewise, each rear guide block 25j has a rear shaft 29 journalled therein having an outer end portion 29a terminating adjacent to the rear end portion 27a of a side shaft 27. Obviously, in certain instances it may be desirable to eliminate the boss 25i or at least so position it that it will not be interposed between the longitudinal central bores 25k and, hence, permit the use of a single rear shaft 29 directly interconnecting the side shafts 27 rather than the two unconnected shafts 29 indicated on the drawing. In this manner, with the use of a single shaft, by oscillating any one of the shafts, all of the other shafts will concurrently oscillate therewith. The front and rear shafts 28 and 29 may otherwise be described as lateral shafts by virtue of their relationship to the side or main shafts 27. Conventional gearing means such as bevel gears 30 respectively secured to the relatively adjacent end portions 27a, 27b, 28a, and 29a of the shafts 27, 28, and 29, respectively, have intermeshing teeth 30a which transmit oscillatable movement uniformly to each of the shafts 27, 28, and 29.

On each of the oscillatable shafts 27, 28, and 29, at least one radial L-shaped finger 31 is provided. These fingers 31 have inwardly bent lower end portions 31a which are shaped to engage and disengage the periphery of an upper glass block section 23 when oscillatory motion is transmitted to the shafts 27, 28, and 29. These fingers 31 are positioned in spaced array about the margin of the body member 25 and support all sides of the glass block section 23 by engaging spaced points on the peripheral rim 23a surrounding the glass block section 23. As illustrated, two such identical L-shaped fingers 31 are mounted on each of the aforementioned shafts in substantially evenly spaced relationship along and relative to each respective side of the upper glass block section 23. Consequently, the fingers 31 contribute substantially evenly balanced and uniformly distributed support to each respective side of the glass block section 23. This latter feature assumes substantial significance in preventing localized sagging of the heat softened sides and sealing edges of the glass block section previously mentioned with respect to the formation of defective seals in the fabricated glass block.

As best illustrated in Fig. 2, the front end portion 27b of each of the shafts 27 extends axially through a bevel gear 30 and mounts a crank-arm 32. A resilient link 33 is pivotally connected to the crank-arm 32. A power operated reciprocatory actuator 37 or actuating head slidably mounted upon an upright guide post 38 is affixed to the body member 25 through the opening 25m in the ledge 25n. The actuator 37 is also pivotally connected to the resilient link 33. The actuator 37, when slidably moved downward along the guide post 38 by the cam operated driving arm 17, pivots each resilient link 33 and crank-arm 32 outward to thereby oscillate each of the main shafts 27 and intergeared shafts 28 and 29. The resilient link 33 comprises in part a hollow cylinder 34 which houses a resilient spring 35 and part of a piston 36 which is axially movable within the hollow cylinder 34. The cylinder insertable end 36a of the piston 36 is fixedly journalled within a perforate disk 36b which compresses the resilient spring 35 against a shoulder 34a located within the cylinder when the piston 36 is moved axially into the cylinder 34. The resilient action of the spring 35 is then transmitted to the fingers 31.

The intergearing of the shafts 27, 28, and 29 simultaneously and uniformly pivots all fingers 31 into peripheral engagement with each side of the glass block section 23 which previously has been positioned intermediate the fingers 31 by either manual or conventional means, not illustrated. The resilient spring action transmitted by the resilient links 33 to the fingers 31 permits the fingers 31 to compensate for substantial configurational variation in successive glass block sections which are engaged by the fingers 31 during repeated sealing operations. Although, as previously indicated, a single shaft may, in certain instances, be utilized in place of the two shafts 29, the provision of two unconnected shafts, as illustrated, permits half of the integeared shafts to oscillate a greater degree than the others, and thus permits the fingers to more readily compensate for possible variations in the configuration of successive block sections.

The uniform and simultaneous movement of the fingers 31 with respect to each side of the glass block section 23 permits the upper supporting chuck 22 to rapidly engage the glass block section 23. Additionally, the marginal spacing of the fingers 31 contributes firm support to all sides of the glass block section 23, to thereby substantially prevent distortion of the heat-softened glass caused by sagging of the glass during the subsequent preheating and sealing operations.

Since it is practically impossible to continuously produce glass block sections which are dimensionally identical, it is necessary to compensate for these dimensional differences in order to provide adequate support for each successive glass block section and prevent consequent misalignment of the sections during the sealing operation. The resilient grasping action imparted to the fingers 31 by the resilient links 33 effectively compensates for these dimensional differences.

It will, of course, be understood that various details of construction may be modified through a wide range without departing from the principles of this invention, and it is, therefore, not the purpose to limit the patent granted hereon otherwise than necessitated by the scope of the appended claims.

I claim:

1. In an apparatus for fabricating hollow glass blocks from preformed glass block sections, a block section supporting chuck comprising a body member arranged to form a backing support for one of said block sections, a pair of main shafts journalled on opposite sides of said body member in opposed relationship and in the same horizontal plane, pairs of cooperating lateral shafts extending laterally of said main shafts on opposite sides of said body member, one of each of said pairs of lateral shafts being interconnected for oscillatory motion with one of said main shafts and the other one of each of said pairs being similarly interconnected with the other of said main shafts, supporting fingers for the block section mounted on all said shafts and arranged for pivotal contact with the peripheral edge of said block section, a power operated reciprocatory actuator, a crank-arm fixedly mounted on each of said main shafts, a resilient linkage interposed between and pivotally interconnecting each said crank-arm with said actuator in such manner as to thereby accommodate independent movement of one main shaft through a limited distance relative to the other main shaft.

2. In an apparatus for fabricating hollow glass blocks from preformed glass block sections, a block section supporting chuck comprising a body member arranged to form a backing support for one of said block sections, a pair of main shafts journalled on opposite sides of said body member in opposed relationship and in the same horizontal plane, pairs of cooperating lateral shafts extending laterally of said main shafts on opposite sides of said body member, one of each of said pairs of lateral shafts being interconnected for oscillatory motion with one of said main shafts and the other one of each of said pairs being similarly interconnected with the other of said main shafts, supporting fingers for the block section depending from said main shafts and said lateral shafts and arranged to pivotally contact and gravitationally support the peripheral edges of said block section, a power operated reciprocatory actuator, a crank-arm fixedly mounted on each of said main shafts, a resilient linkage interposed between and pivotally interconnecting each said crank-arm with said actuator in such manner as to thereby accommodate independent movement of one main shaft through a limited distance relative to the other main shaft.

3. In an apparatus for fabricating hollow glass blocks from preformed glass block sections, a block section supporting chuck comprising a body member arranged to form a backing support for one of said block sections, a pair of main shafts journalled on opposite sides of said body member in opposed relationship and in the same horizontal plane, pairs of cooperating lateral shafts extending laterally of said main shafts on opposite sides of said body member, one of each of said pairs of lateral shafts being grouped and interconnected for oscillatory movement with one of said main shafts and the other one of each of said pairs being similarly grouped and interconnected with the other of said main shafts, supporting fingers for the block section mounted on all said shafts arranged for pivotal contact with the peripheral edges of said block section, a power operated reciprocatory actuator, a crank-arm fixedly mounted on each of said main shafts, a resilient linkage interposed between and pivotally interconnecting each said crank-arm with said actuator and accommodating movement of one group of shafts through a limited distance independently of the other group of shafts.

4. In an apparatus for fabricating hollow glass blocks from preformed glass block sections, a block section supporting chuck comprising a body member arranged to form a backing support for one of said block sections, a pair of main shafts journalled on opposite sides of said body member in opposed relationship and in the same horizontal plane, pairs of cooperating lateral shafts extending laterally of said main shafts on opposite sides of said body member, one of each of said pairs of lateral shafts being grouped and interconnected for oscillatory movement with one of said main shafts and the other one of each of said pairs being similarly grouped and interconnected with the other of said main shafts, supporting fingers for the block section depending from said main and said lateral shafts and arranged to pivotally contact and gravitationally support the peripheral edges of said block section, a power operated reciprocatory actuator, a crank-arm fixedly mounted on each of said main shafts, a resilient linkage interposed between and pivotally interconnecting each said crank-arm with said actuator in such manner as to accommodate movement of one group of shafts through a limited distance independently of the other group of shafts.

References Cited in the file of this patent

UNITED STATES PATENTS

| | | |
|---|---|---|
| 767,935 | Good | Aug. 16, 1904 |
| 1,807,286 | Goetz et al. | May 26, 1931 |
| 1,921,389 | Ingle | Aug. 8, 1933 |
| 2,173,079 | Moody | Sept. 12, 1939 |
| 2,191,952 | Blau | Feb. 27, 1940 |
| 2,402,387 | Ferguson et al. | June 18, 1946 |
| 2,448,881 | Glynn | Sept. 7, 1948 |